Dec. 28, 1926.
P. HLEB
SECURING DEVICE
Filed Nov. 2, 1922
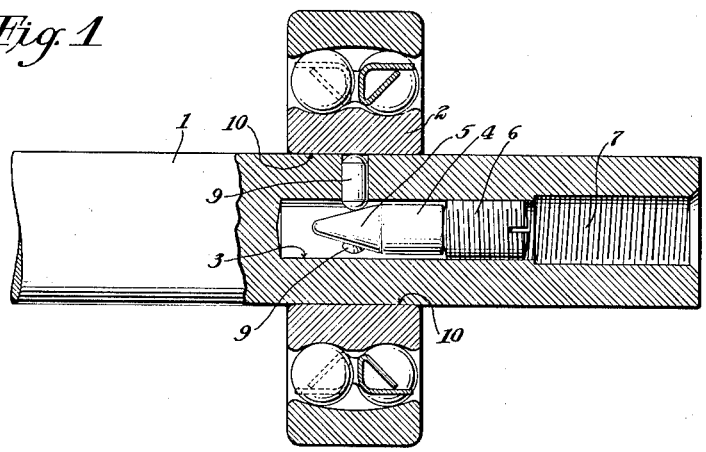
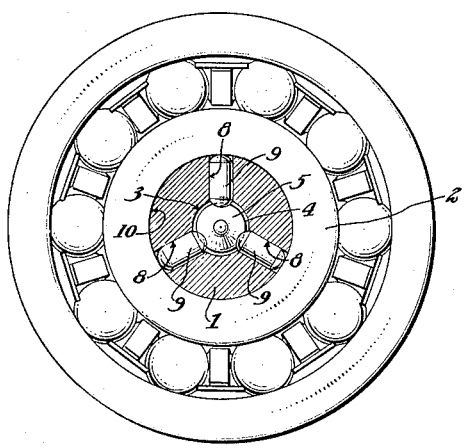

Patented Dec. 28, 1926.

1,611,912

UNITED STATES PATENT OFFICE.

PETER HLEB, OF ELIZABETH, NEW JERSEY, ASSIGNOR TO THE SINGER MANUFACTURING COMPANY, OF ELIZABETH, NEW JERSEY, A CORPORATION OF NEW JERSEY.

SECURING DEVICE.

Application filed November 2, 1922. Serial No. 598,461.

This invention relates to means for securing ball bearings, collars, rings or other similar apertured members to shafts, bars, rods or other similar penetrant members. The invention has for an object to provide a securing means of the class described which will be simple, effective and inexpensive to manufacture, and which may be easily manipulated to secure or release the apertured member.

The invention has for a further object to provide the penetrant member with securing means of the class described, which will function without distortion, warping or alteration of the size of the apertured member.

To these ends the penetrant member is provided with an internal, free-floating, longitudinally movable member having, preferably, a wedging engagement with a plurality of outwardly directed members fitted to apertures in the side wall of the penetrant member.

Endwise movement of the internal member will cause the outwardly directed elements or pins to impinge with equalized pressures upon the inner or shaft engaging wall of the apertured or collar member and tighten it securely upon the penetrant member or shaft. The endwise movement of the internal member may be effected by means of a screw threaded endwise into the penetrant member.

In the accompanying drawings, Fig. 1 is a longitudinal section of a shaft carrying a ball bearing and embodying the invention. Fig. 2 is a transverse section of the shaft. Fig. 3 is a perspective view of one of the securing elements shown in Figs. 1 and 2, and Figs. 4 and 5 are perspective views of modified forms of securing elements.

In the embodiment of the invention illustrated in Figs. 1, 2 and 3, the numeral 1 represents the balance wheel end-portion of the main-shaft of a sewing machine, such as illustrated in the patent to Diehl, No. 1,171,327, of February 8, 1916. If, for example, it be desired to mount the main-shaft of this machine in a ball bearing-unit of the well known SKF type having inner and outer ball-races or rings with an interposed ball-cage, the problem is presented of providing suitable means to secure the inner race or ring 2 of such bearing unit to the shaft 1 without distortion of such ring and in such a manner that it may be readily applied to and removed from such shaft. According to the present improvement the shaft is formed with a central longitudinal bore 3 in which is loosely fitted the free-floating pin 4 having a tapered or wedge-like extremity 5. The bore 3 is preferably tapped for a set-screw 6 which may be caused to force the pin 4 endwise of the shaft 1.

The threaded aperture 7 is provided for the attachment of the usual sewing machine balance wheel and has nothing to do with the present invention.

The shaft 1 is formed with radial holes 8 which intersect or communicate with the central hole 3 and to which are fitted securing elements preferably in the form of pins 9 having rounded outer and inner extremities. Preferably the pins 9 are three in number and are spaced 120°; their length being such that their inner ends may be engaged by the tapered extremity 5 of the pin 4, under the influence of the screw 6, and their outer ends caused to impinge upon the shaft contacting wall 10 of the ring member 2, thus securely tightening such member to the shaft. By applying a screw-driver endwise of the shaft 1 to the screw 6, the ring member may be readily freed from the shaft and the parts disassembled. The pin 4 is a free floating member and is preferably constructed separate from the screw 6 and somewhat smaller than the aperture 3 so that inequalities in the lengths of the pins 9 may be compensated for and the pressures on the pins equalized by a side shift of the pin 4.

Various modifications of the invention will readily suggest themselves to those skilled in the art. For example, the outer ends of the pins may be taper pointed, as shown at 11 in Fig. 4, whereby they may be forcibly embedded in the metal of the ring member. This, however, would not be desirable in case the ring member is hardened or in the form of a ball race, since even slight distortion of the ball race is generally to be avoided.

Square pins, such as shown at 12, Fig. 5, may be used instead of round pins and may have their outer ends 13 ground truly cylindrical with the shaft 1 so as to engage the ring member across their entire outer end surfaces. The device functions as an internal set-screw and the pins 9 may be formed with any of the usual set-screw terminal shapes.

Having thus set forth the nature of the invention, what I claim herein is:

The combination with a shaft, of a ring member snugly fitting said shaft, said shaft having a longitudinal aperture and a plurality of radial apertures disposed substantially in the same plane transversely of the shaft and entering said longitudinal aperture, a securing element in each of said radial apertures, and a free-sidewise-floating screw-propelled wedge movable in and lengthwise of said longitudinal aperture in engagement with the inner portions of said securing elements for forcing the latter outwardly into engagement with said ring member with equalized pressures.

In testimony whereof, I have signed my name to this specification.

PETER HLEB.